United States Patent
Bogue et al.

(10) Patent No.: US 7,622,178 B2
(45) Date of Patent: Nov. 24, 2009

(54) METALLIC DOUBLER REPAIR OF COMPOSITE ARCUATE FLANGES

(75) Inventors: William F. Bogue, Hebron, CT (US); Christopher J. Hertel, Wethersfield, CT (US); Brian K. Holland, Lansing, MI (US)

(73) Assignee: United Technologies Corporation, Hartford, CT (US)

( * ) Notice: Subject to any disclaimer, the term of this patent is extended or adjusted under 35 U.S.C. 154(b) by 392 days.

(21) Appl. No.: 11/396,479

(22) Filed: Apr. 3, 2006

(65) Prior Publication Data

US 2007/0240819 A1    Oct. 18, 2007

(51) Int. Cl.
  *E02D 37/00*  (2006.01)
  *E04G 23/00*  (2006.01)
  *B29C 73/00*  (2006.01)
  *B29C 65/00*  (2006.01)
  *B32B 43/00*  (2006.01)
  *B32B 37/00*  (2006.01)
  *B32B 3/26*   (2006.01)

(52) U.S. Cl. .............. 428/63; 52/514; 156/94; 156/293; 264/36.1; 285/15

(58) Field of Classification Search ............ 52/514, 52/514.5, 787.1; 16/2.5; 138/97, 98, 99; 29/402.01, 402.09, 402.11, 402.18; 156/94, 156/294; 264/36.1, 36.15, 36.16; 285/15, 285/16, 17, 45, 46, 47, 48, 50, 363, 406, 285/408; 428/63; 411/501; 464/181; 4/252.4, 4/252.5, 252.6

See application file for complete search history.

(56) References Cited

U.S. PATENT DOCUMENTS

| 2,146,461 | A | * | 2/1939 | Bettington ................. 29/512 |
| 2,752,579 | A | * | 6/1956 | Caldwell et al. ............ 439/191 |
| 4,003,288 | A | * | 1/1977 | Jeal ............................. 411/70 |
| 4,171,626 | A | * | 10/1979 | Yates et al. ................. 464/181 |
| 4,173,128 | A | * | 11/1979 | Corvelli ...................... 464/97 |
| 4,323,603 | A | * | 4/1982 | Close .......................... 524/545 |
| 4,563,232 | A | * | 1/1986 | Peake ......................... 156/182 |
| 4,588,626 | A | * | 5/1986 | Cologna et al. .............. 428/63 |
| 4,695,602 | A | * | 9/1987 | Crosby et al. ............... 524/439 |
| 4,916,880 | A | * | 4/1990 | Westerman, Jr. ............ 52/514 |

(Continued)

FOREIGN PATENT DOCUMENTS

DE    8333241    4/1984

(Continued)

OTHER PUBLICATIONS

Jul. 30, 2007 European Search Report.

(Continued)

*Primary Examiner*—Richard Crispino
*Assistant Examiner*—Brian R Slawski
(74) *Attorney, Agent, or Firm*—Kinney & Lange, P.A.

(57) ABSTRACT

An assembly includes a composite flange, an insert, an adhesive and a support. The composite flange has at least one damaged aperture. The insert is positioned in the damaged aperture and extends therefrom to provide compressive load transfer through the composite flange. The adhesive is positioned directly on at least a portion of the composite flange proximate the damaged aperture. The support is positioned over the adhesive and contacts the insert.

21 Claims, 6 Drawing Sheets

U.S. PATENT DOCUMENTS

| | | | |
|---|---|---|---|
| 4,937,691 A * | 6/1990 | Narayan et al. | 360/97.01 |
| 5,059,059 A | 10/1991 | Cox | |
| 5,168,385 A * | 12/1992 | Kobayashi et al. | 359/209 |
| 5,185,890 A | 2/1993 | Dismore et al. | |
| 5,271,658 A | 12/1993 | Haldenwanger et al. | |
| 5,876,651 A | 3/1999 | Blackburn, Jr. et al. | |
| 5,965,240 A | 10/1999 | Blackburn et al. | |
| 6,428,374 B1 * | 8/2002 | Nuss | 440/88 R |
| 6,598,241 B1 | 7/2003 | Williams | |
| 2001/0023734 A1 * | 9/2001 | Tavakoli et al. | 156/60 |
| 2001/0036559 A1 * | 11/2001 | Haack et al. | 428/577 |
| 2003/0053882 A1 | 3/2003 | Reuter | |

FOREIGN PATENT DOCUMENTS

| | | |
|---|---|---|
| GB | 1551251 | 8/1979 |
| JP | 06034083 | 2/1994 |
| WO | 9412338 | 6/1994 |
| WO | 9829002 | 6/1998 |

OTHER PUBLICATIONS

Mar. 31, 2009 European Search Report.
Edward M. Petrie, Handbook of Adhesives and Sealants, McGraw-Hill, 2000, pp. 430-431.

* cited by examiner

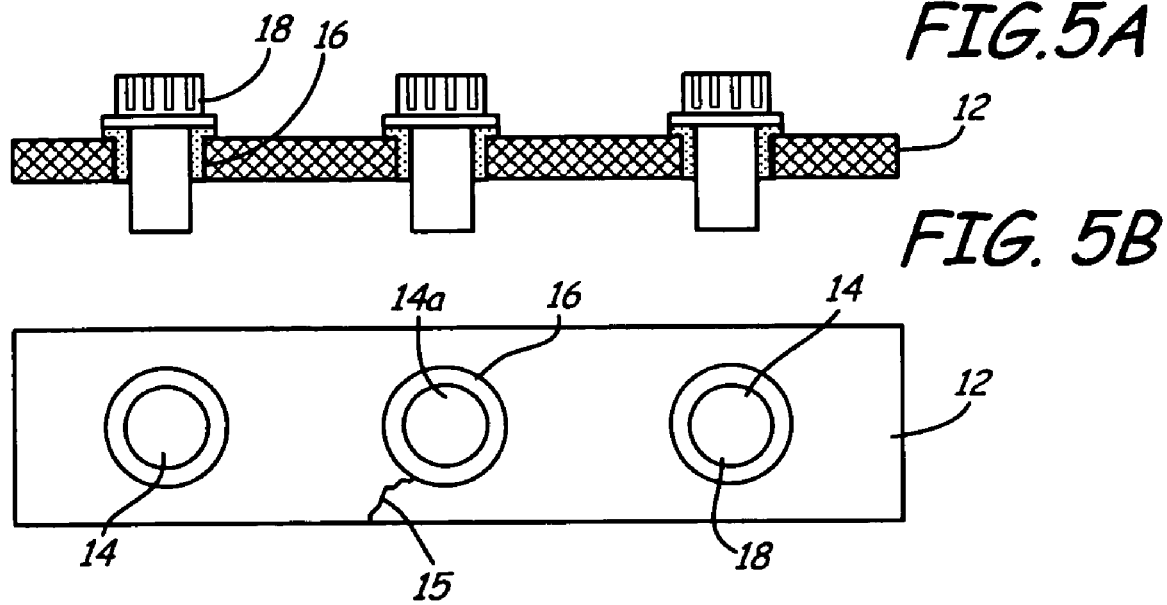
FIG. 5A
FIG. 5B
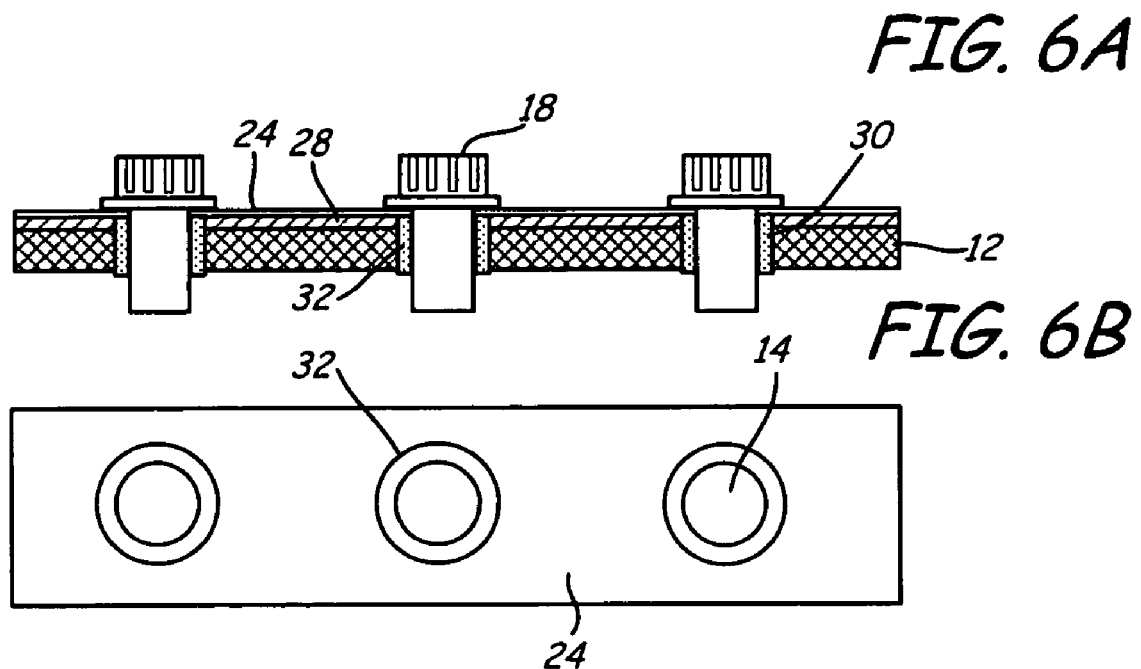
FIG. 6A
FIG. 6B

METALLIC DOUBLER REPAIR OF COMPOSITE ARCUATE FLANGES

BACKGROUND OF THE INVENTION

The present invention generally relates to the field of repairing composite structures. In particular, the invention relates to doubler repair assemblies for composite arcuate flanges.

Composite structures that are formed of a thermoplastic material such as polyamideimide or polyetherimide are resistant to high temperatures and engine fluids. Thus, these composite structures can be exposed to extreme environments, such as hot engine oils in aircraft engines, which typically cause degradation of mechanical properties of most other elastomeric materials. However, while the composite structure may be temperature resistant, the composite structure and its parts are subjected to thermal stresses when rigidly attached to metal structures with significantly different coefficients of thermal expansion, causing cracks in the weaker composite structure. For example, arcuate flanges formed of composite materials can easily form cracks radiating from apertures in the flanges where the bolts are positioned. If left unattended, the thermal stresses of the environment may cause the crack to continue to extend to the edge of the flange and cause the entire flange to break.

Traditional repair techniques are limited to flange reconstruction techniques using fiberglass/epoxy laminates or either solvent or thermal welded replacement sections. Most of these current repair techniques result in a repair assembly that has inferior mechanical properties when compared to the original structure and also do not account for thermal disparity between parts. One method of repairing the damaged composite structure is to replace the entire structure. However, this can be a costly process, particularly if only a single aperture or only a small percentage of the composite structure is damaged. Another option is to restore only a piece or segment of the flange to a workable condition using a splint or doubler assembly that is applied to the damaged portion of the structure. Additional methods of repairing a damaged composite structure are described in U.S. Pat. Nos. 5,876,651 and 5,965,240, issued to Blackburn et al.

BRIEF SUMMARY OF THE INVENTION

An assembly includes a composite flange, an insert, an adhesive and a support. The composite flange has at least one damaged aperture. The insert is positioned in the damaged aperture and extends therefrom to provide compressive load transfer through the composite flange. The adhesive is positioned directly on at least a portion of the composite flange proximate the damaged aperture. The support is positioned over the adhesive and contacts the insert.

BRIEF DESCRIPTION OF THE DRAWINGS

FIG. 5A is a partial side view of a damaged arcuate flange.

FIG. 5B is a partial top view of the damaged arcuate flange of FIG. 5A.

FIG. 6A is a partial side view of a repaired arcuate flange having a doubler.

FIG. 6B is a partial top view of the repaired arcuate flange of FIG. 6A having a doubler assembly.

DETAILED DESCRIPTION

Figure 1:
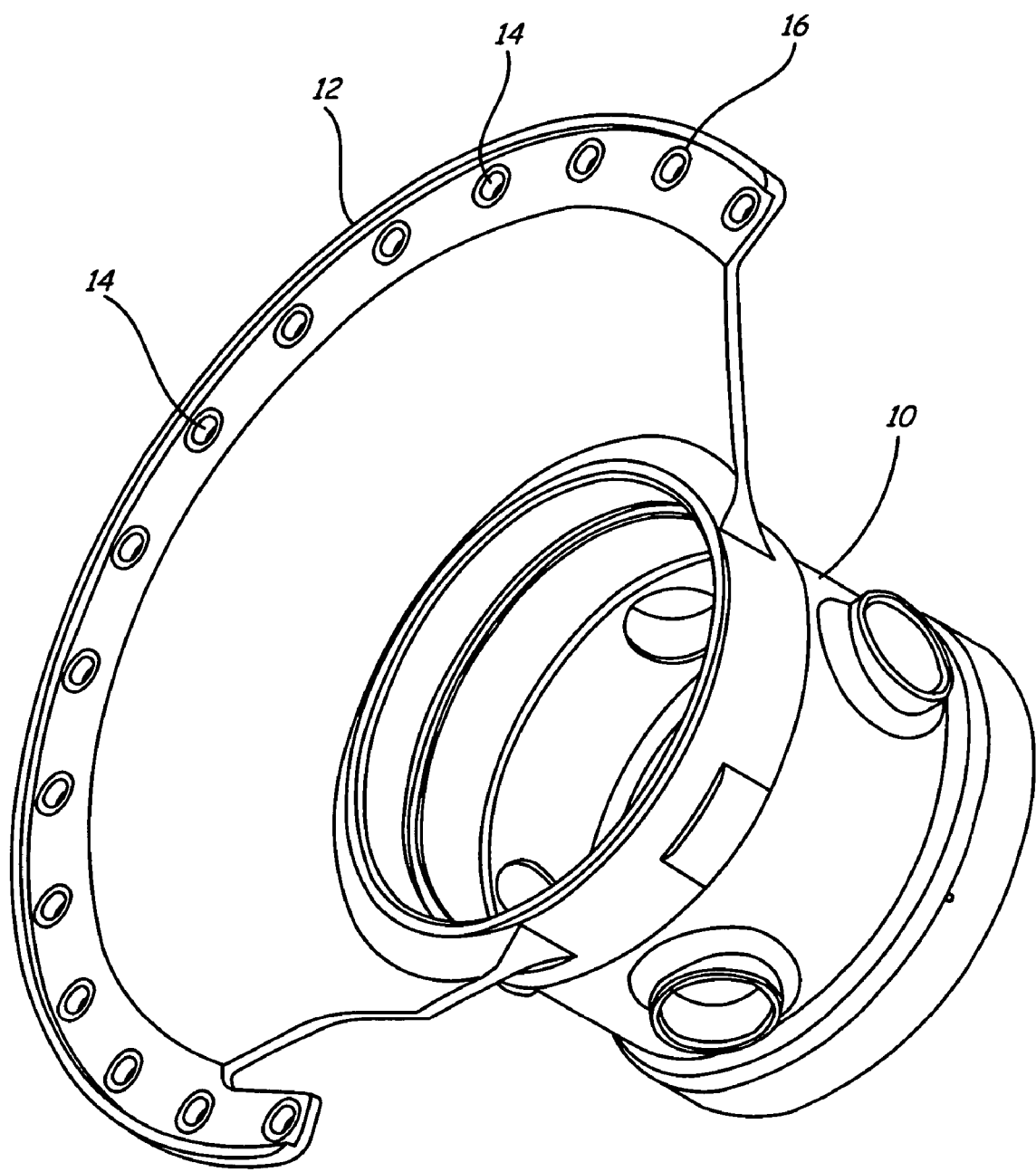
FIG. 1 is a perspective view of an arcuate flange having apertures.

FIG. 1 shows a perspective view of composite seal 10 with arcuate flange 12. Composite seal 10 is formed of a thermoplastic material and is typically exposed to extreme environments such as high-temperature jet engine oils. Arcuate flange 12 extends from composite seal 10 and has a plurality of apertures 14 along its perimeter. Bushings 16 and bolts 18 (shown in FIG. 5A) are positioned within apertures 14 of arcuate flange 12 and are used to connect composite seal 10 to a structure, such as a gearbox housing. Due to the extreme environment in which composite seal 10 is typically located, thermal stress resulting from coefficient of thermal expansion mismatches is constantly exerted on composite seal 10, and particularly on apertures 14 of arcuate flange 12. Thus, the area proximate apertures 14 can crack, with the crack typically radiating outward on arcuate flange 12 to the perimeter of composite seal 10.

Figure 2:
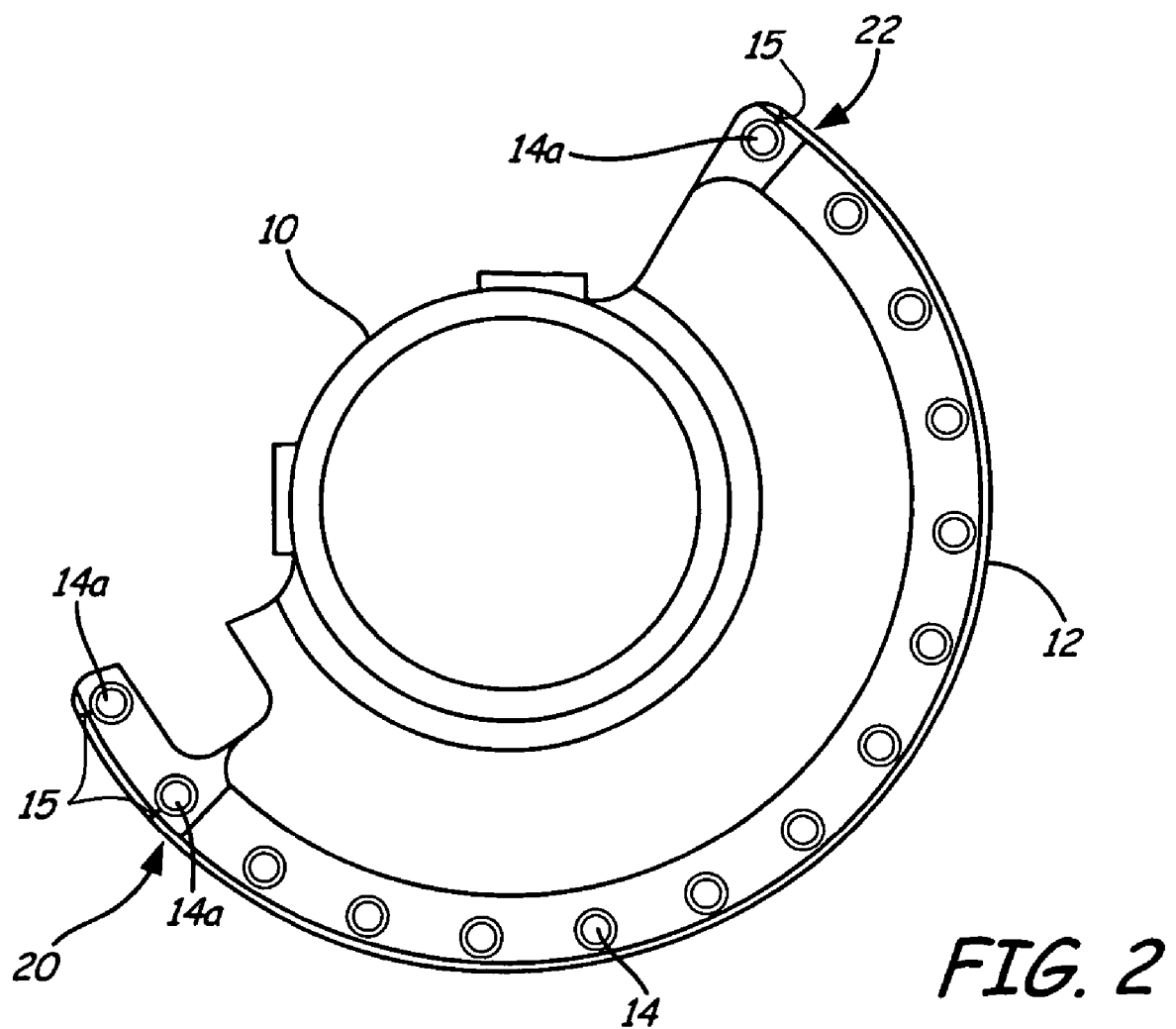
FIG. 2 is a top view of the arcuate flange having damaged ends.

FIG. 2 shows a top view of arcuate flange 12 having a damaged aperture 14a with crack 15 at wing end 20 and a damaged aperture 14a with crack 15 at non-wing end 22. Arcuate flange 12 could be repaired by conventional methods by trimming the cantilevered area, or the area proximate the damaged apertures 14a to remove damaged wing end 20 and damaged non-wing end 22 from arcuate flange 12, leaving only the undamaged apertures 14 on arcuate flange 12. Alternatively, the systems and methods of this invention can be used to repair such damage.

Figure 3:
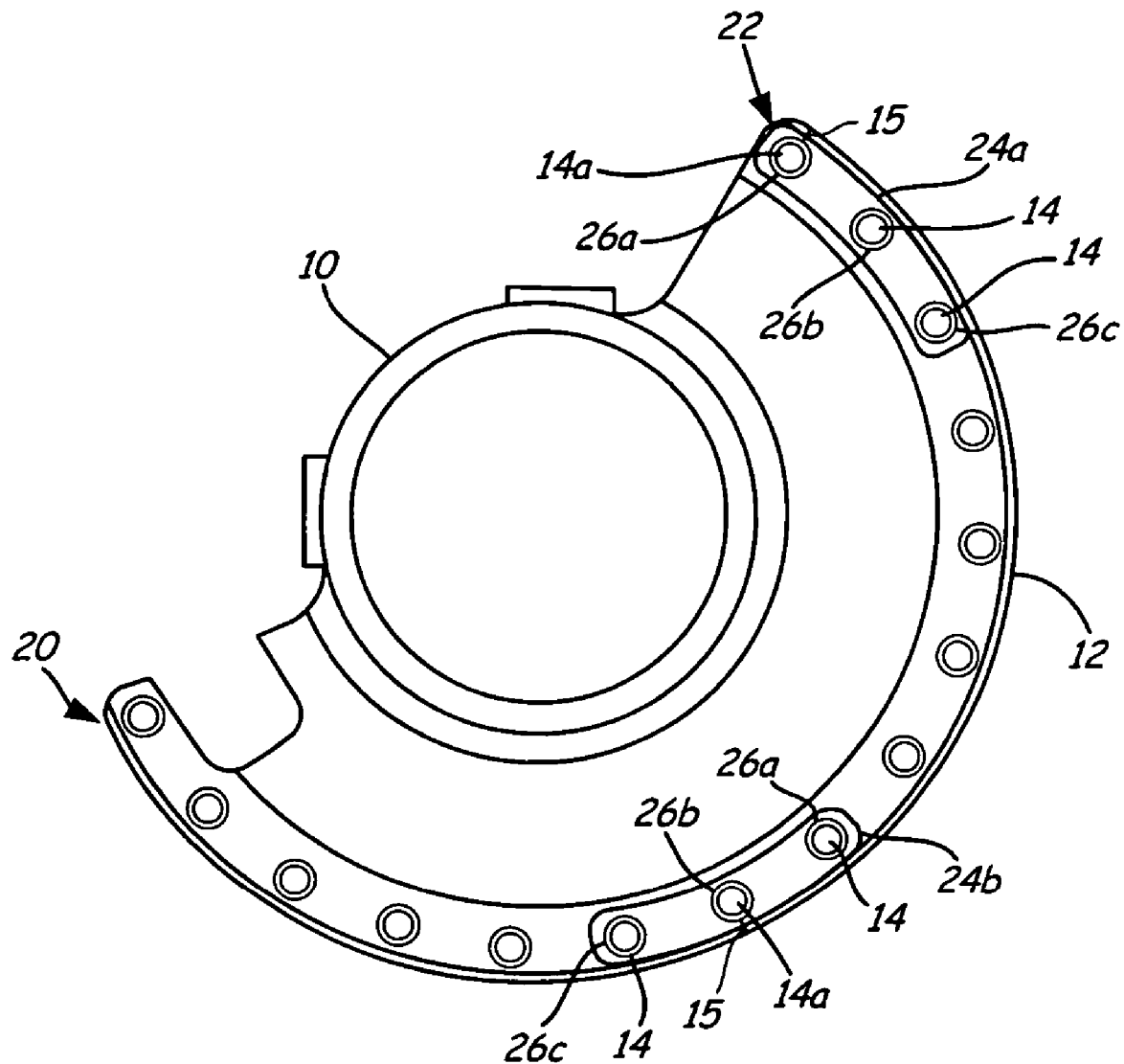
FIG. 3 is a top view of the arcuate flange having a three-hole doubler in two different locations.

FIG. 3 shows a top view of arcuate flange 12 having doubler 24, and specifically, two different three-hole doublers 24a and 24b. The following general discussion involving doubler 24 refers to all doublers subsequently disclosed. Doubler 24 is preferably fabricated having holes 26 with a diameter similar to apertures 14 of arcuate flange 12 to overlap damaged aperture 14a as well as undamaged apertures 14 proximate damaged apertures 14a. Doubler 24 is preferably formed of a material that is stronger than the material of composite arcuate flange 12 and that has a coefficient of thermal expansion similar to the coefficient of thermal expansion of the material that arcuate flange 12 is rigidly attached to. That allows the damaged area of arcuate flange 12 to be strengthened by doubler 24, which is designed to act as a repair of an existing part. Cracks 15 radiating from damaged aperture 14a can be bridged using doubler 24, which is operatively connected (i.e. bonded) to arcuate flange 12. While those skilled in the art will understand that doubler 24 can be made of any suitable material, in one embodiment, doubler 24 is made of stainless steel.

First and second three-hole doublers 24a and 24b as shown in FIG. 3, represent two exemplary uses of three-hole doubler 24. In these particular embodiments, only one aperture 14a covered by each three-hole doubler 24a or 24b is damaged, while the remaining two apertures 14 covered by each three-hole doubler 24a or 24b are undamaged. In first doubler 24a, damaged aperture 14a is at non-wing end 22 of arcuate flange 12. First doubler 24a is thus positioned on arcuate flange 12 such that an end hole 26a of first doubler 24a is positioned over damaged aperture 14a, while the remaining two holes 26b and 26c of three-hole doubler 24a are positioned over undamaged apertures 14.

Second doubler 24b is positioned on arcuate flange 12 such that center hole 26b of second doubler 24b is positioned over damaged aperture 14a, while the remaining two holes 26a and 26c of three-hole doubler 24b are positioned over undamaged holes 14. In some embodiments, it may be desirable to have no more than six of the fifteen apertures 14 of arcuate flange 12 covered by doublers 24, with no more than two damaged apertures 14a having cracks 15 radiating therefrom. As shown in FIG. 3, three-hole doublers 24a and 24b may be most effective if only one of the three apertures that three-hole doublers 24a and 24b cover is damaged, but other embodiments are also possible.

Figure 4:
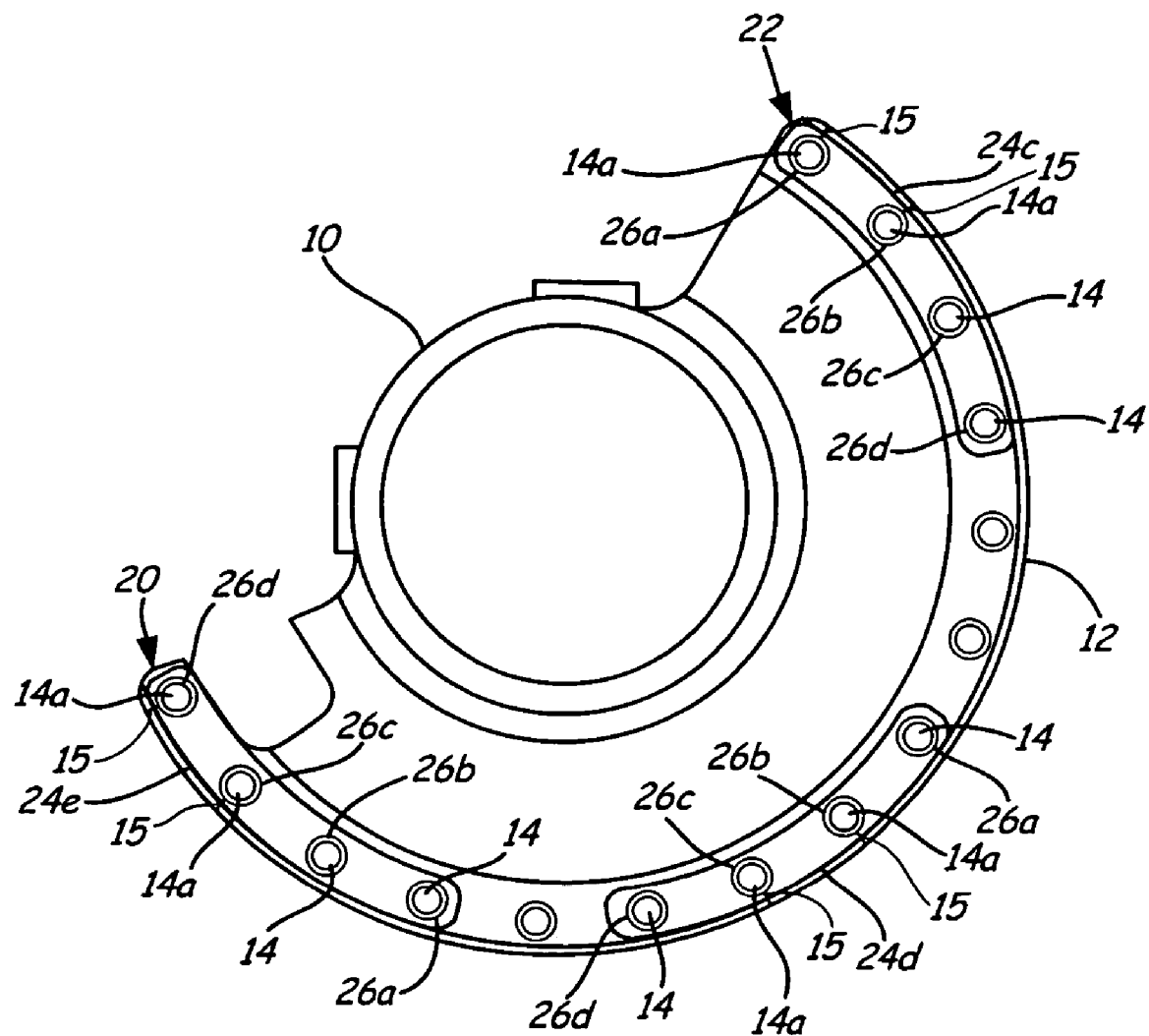
FIG. 4 is a top view of the arcuate flange having a four-hole doubler in three different locations.

Three different exemplary uses of four-hole doublers are shown in FIG. 4. Four-hole doublers 24c-24e function in the same manner as three-hole doublers 24a and 24b, except that four-hole doublers 24c-24e are designed with four-holes, rather than just three. In four-hole doubler 24c, damaged aperture 14a is on non-wing end 22 of arcuate flange 12. Four-hole doubler 24c is thus positioned on arcuate flange 12 such that an end hole 26a of third doubler 24c is positioned over damaged aperture 14a, while the remaining three holes 26b-26d of four-hole doubler 24c are positioned over undamaged apertures 14. In some embodiments, the last hole 26d of four-hole doubler 24c will cover an undamaged aperture 14, and at least one of the middle holes 26b and 26c will also cover an undamaged aperture 14.

Four-hole doubler 24d is shown being used to repair two adjacent damaged apertures 14a. To repair arcuate flange 12, four-hole doubler 24d may be positioned on arcuate flange 12 such that center holes 26b and 26c of four-hole doubler 24d are positioned over damaged apertures 14a, while end holes 26a and 26d are positioned over undamaged apertures 14 on either side of damaged apertures 14a.

Four-hole doubler 24e is shown being used to repair two other adjacent damaged apertures 14a on wing end 20 of arcuate flange 12. Four-hole doubler 24e is positioned on arcuate flange 12 such that end hole 26d and center hole 26c of four-hole doubler 24e are positioned over damaged apertures 14a, while end hole 26a and center hole 26b are positioned over undamaged apertures 14. In some embodiments, it may be desirable to have no more than eight out of fifteen apertures 14 covered by doublers 24 with no more than four damaged apertures 14a having cracks 15 radiating therefrom. As shown in FIG. 4, four-hole doublers 24c-24e may be most effective if only two of the four apertures that four-hole doublers 24c-24e cover are damaged, but other embodiments are also possible.

FIGS. 5A and 5B show a partial side view and a partial top view, respectively, of arcuate flange 12 with two undamaged apertures 14 and a damaged aperture 14a. In operation, a bushing 16 and a bolt 18 are positioned in each aperture 14 of arcuate flange 12. Bushing 16 provides a compressive load path for bolt 18 through arcuate flange 12. When exposed to high thermal stress, apertures 14 may exhibit damage in the form of cracking. Damaged aperture 14a can be distinguished by crack 15 radiating from damaged aperture 14a to the perimeter of arcuate flange 12. When arcuate flange 12 has a damaged aperture 14a, doubler 24 (shown in FIGS. 6A and 6B) may be used to repair arcuate flange 12.

FIGS. 6A and 6B show a partial side view and a partial top view, respectively, of arcuate flange 12 with doubler 24 installed. Doubler 24 is used to transfer the load across the damaged area of arcuate flange 12 and to provide compressive load distribution at apertures 14. A thin sheet, or thick film adhesive 28 may be positioned on top of the surface of arcuate flange 12 to act as an expansion joint between arcuate flange 12 and doubler 24. Before adhesive 28 is positioned on arcuate flange 12, holes 30 may be cut from adhesive 28 to allow inserts 32 to be positioned within apertures 14 and overlap apertures 14. Adhesive 28 may comprise any suitable material. In some embodiments, adhesive 28 may be a fluoroelastomer film that is stable in high temperature environments, for example, DuPont's Viton® fluoroelastomer, available from Eagle Elastomer, Cuyahoga Falls, Ohio. In some embodiments, it may be desirable to use a fluoroelastomer for adhesive 28 because of its rubbery and ductile properties, which allow for thermal expansion differences when heated to high temperatures. Additionally, fluoroelastomers may be employed for their fluid resistance, which is necessary in extreme environments, such as near hot aircraft engine oil. Doubler 24 may then be positioned over adhesive 28 and thereby become attached to arcuate flange 12, bridging the damaged area of arcuate flange 12.

Figure 7:
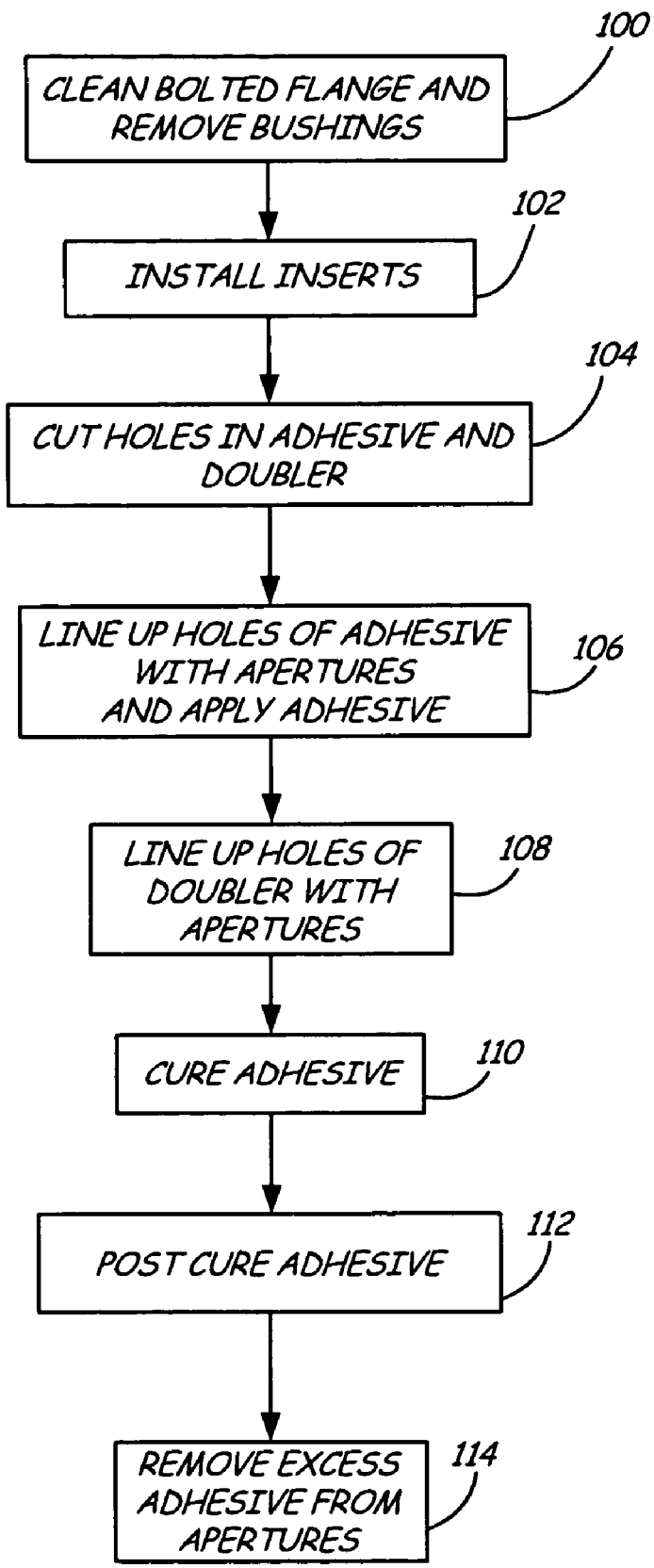
FIG. 7 is a block diagram of a method of installing the doubler to the arcuate flange.

FIG. 7 shows an exemplary non-limiting method of installing doubler 24 to an arcuate flange 12 having one or more damaged apertures 14a. First, the surface of arcuate flange 12 may be cleaned and the cracked material may be trimmed away, if desired, as represented by Step 100. Any adhesive in damaged aperture 14a around bushing 16 may also be removed. Additionally, any remaining bushings 16 in apertures 14 on either side of damaged aperture 14a may also be removed.

In some embodiments, repair inserts 32 may then be attached to arcuate flange 12 in any suitable manner, such as by being tack welded to doubler 24 or bonded to arcuate flange 12, as represented by Step 102. Inserts 32 may comprise any suitable material, such as for example, a metallic material. In some embodiments, inserts 32 can be bonded with a high temperature epoxy to damaged apertures 14a, replacing the original bushings 16. Inserts 32 provide a load transfer path through arcuate flange 12 by extending beyond both faces of arcuate flange 12. The rigid bond created by inserts 32 may help restore damaged apertures 14a. In another embodiment, inserts 32 may be tack welded to metallic doubler 24 for certain locations, such as on wing end 20 or non-wing end 22 where arcuate flange 12 is trimmed away to remove damage, where doubler 24 may be cantilevered over the area that wing end 20 or non-wing end 22 previously occupied to prevent misalignment of arcuate flange 12 during assembly.

In some embodiments, holes 30 may then be cut from adhesive 28 to match up with apertures 14 of arcuate flange 12. Doubler 24 is preferably machine-holed with any appropriate number of holes, depending on the needs of the particular arcuate flange 12 (represented by Step 104). After lining up holes 30 in adhesive 28 with inserts 32 positioned in apertures 14 and damaged aperture 14a of arcuate flange 12, adhesive 28 may be applied to the surface of arcuate flange 12, Step 106. Holes 26 of doubler 24 may then be aligned with apertures 14 and 14a and inserts 32, Step 108. In some embodiments, it may be preferable to prevent bonding between inserts 32 and doubler 24. In some embodiments, doubler 24 may be mechanically clamped to arcuate flange 12 while adhesive 28 is curing.

When adhesive 28 is initially positioned on arcuate flange 12, adhesive 28 is preferably in a semi-cured state. Adhesive 28 may then be heated to a temperature sufficient to cure adhesive 28 to arcuate flange 12 and doubler 24, as represented by Step 110. Adhesive 28 may also be cured at a sufficient pressure to bring adhesive 28 into contact with both arcuate flange 12 and doubler 24. In some embodiments, adhesive 28 may be heated to a temperature of approximately 320° F. to 360° F. for approximately fifteen minutes to thirty minutes under vacuum or at a pressure of approximately 10 pounds per square inch (psi) to 100 psi. Doubler 24 may then be allowed to cool to approximately 150° F. before removing the clamp. After doubler 24 has cooled down, adhesive 28 may then be post cured, Step 112. In some embodiments, adhesive 28 may be post cured by being heated to a temperature of approximately 340° F. to 360° F. for approximately two to four hours.

Any excess adhesive 28 may then be removed from apertures 14 and 14a while maintaining adhesive 28 around the perimeter of doubler 24, as represented by Step 114. Adhesive is preferably excluded between the contact surfaces of inserts 32 and doubler 24 so that adhesive 29 does not prevent load transfer between doubler 24 and inserts 32.

The doubler assembly of the present invention can be used to repair damaged apertures of various composite structures, such as those that are exposed to harsh environments.

Although the present invention has been described with reference to preferred embodiments, workers skilled in the art will recognize that changes may be made in form and detail without departing from the spirit and scope of the invention. For example, while only three or four aperture doublers were described, the doublers of this invention could have any number of apertures therein.

The invention claimed is:

1. An assembly comprising:
   a bolt;
   a composite flange having at least one damaged bolt hole with a crack extending from the bolt hole to an outer edge of the composite flange;
   an insert positioned in the damaged bolt hole and extending therefrom, the insert adapted to receive the bolt to provide for compressive load transfer through the composite flange and thereby minimize application of compressive load produced by the bolt on the composite flange;
   an adhesive accommodating of thermal expansion differences positioned on at least a portion of the composite flange proximate the damaged bolt hole; and
   a support positioned over the adhesive and contacting the insert.

2. The assembly of claim 1, wherein the adhesive is capable of bonding the support to the composite flange.

3. The assembly of claim 1, wherein the adhesive is capable of acting as an expansion joint between the composite flange and the support.

4. The assembly of claim 1, wherein the adhesive comprises a fluoroelastomer material.

5. The assembly of claim 1, wherein the support comprises a metallic material.

6. The assembly of claim 1, wherein the support comprises at least three bolt holes therein.

7. The assembly of claim 1, wherein the support is capable of distributing a load across at least one damaged bolt hole.

8. The assembly of claim 1, wherein the insert comprises a metallic material.

9. An assembly comprising:
   a bolt;
   a thermoplastic structure having at least one damaged bolt hole with a crack extending from the bolt hole to an outer edge of the thermoplastic structure;
   an insert positioned in the damaged bolt hole and extending therefrom, the insert adapted to receive the bolt to provide for compressive load transfer through the thermoplastic structure and thereby minimizing application of compressive load produced by the bolt on the thermoplastic structure;
   an adhesive accommodating of thermal expansion differences that is stable in harsh environments and is positioned on the thermoplastic structure; and
   an overlapping support positioned on the expandable adhesive and contacting the insert.

10. The assembly of claim 9, wherein the overlapping support is capable of spreading a compressive load across a damage site.

11. The assembly of claim 10, wherein the damage site is an area proximate the damaged bolt hole of the thermoplastic structure.

12. The assembly of claim 9, wherein the adhesive is a fluoroelastomer.

13. The assembly of claim 9, wherein the overlapping support is bonded to the thermoplastic structure by the adhesive.

14. The assembly of claim 12, wherein the adhesive is in a semi-cured state prior to bonding.

15. The assembly of claim 9, wherein the insert comprises a metallic material.

16. The assembly of claim 9, wherein the overlapping support comprises a metallic material.

17. A repair assembly comprising:
   a plurality of bolts;
   a composite flange having first plurality of bolt holes at least one of which is a damaged bolt hole with a crack extending from the bolt hole to an outer edge of the composite flange;
   a support positioned over a surface of the composite flange and having a second plurality of bolt holes which align with the first plurality of bolt holes in the composite flange including the damaged bolt hole;
   a plurality of inserts disposed in the first plurality of bolt holes and contacting the support, the inserts adapted to receive the bolts to provide for compressive load transfer through the composite flange which minimizes application of compressive load produced by the bolts on the composite flange; and
   an adhesive accommodating of thermal expansion differences positioned on at least a portion of the composite flange proximate the first plurality of bolt holes to bond the support to the composite flange.

18. The repair assembly of claim 17, wherein the support is capable of distributing a load across at least one damaged bolt hole.

19. The repair assembly of claim 17, wherein the adhesive is capable of acting as an expansion joint between the composite flange and the support.

20. The repair assembly of claim 17, wherein the adhesive comprises a fluoroelastomer material.

21. The repair assembly of claim 17, wherein the support comprises a metallic material.

* * * * *